(No Model.) 2 Sheets—Sheet 2.
S. B. HART.
GRAIN DRILL.
No. 306,153. Patented Oct. 7, 1884.
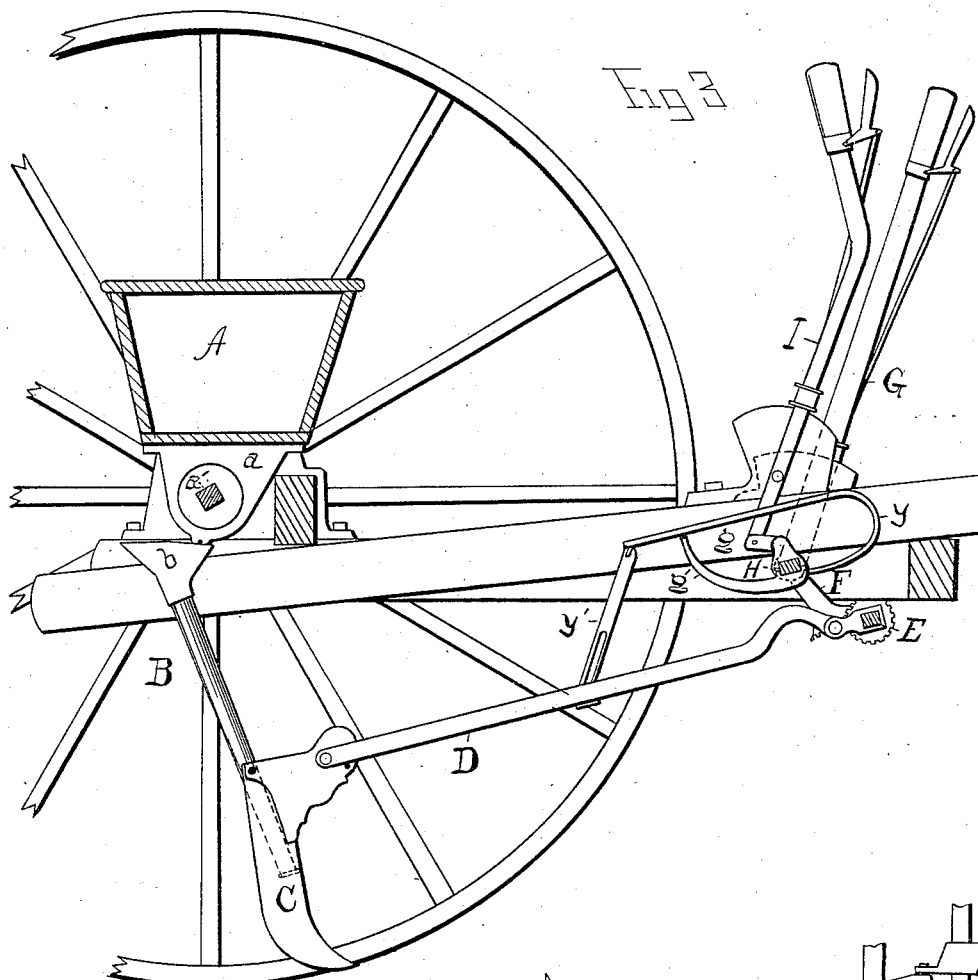
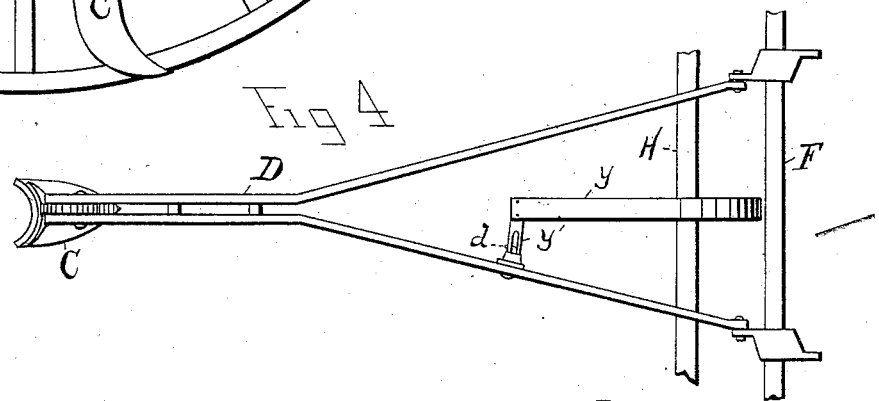
WITNESSES:
E. L. Thurston.
John Hill
INVENTOR:
Stacy B. Hart
by Hill & Dixon
His Attorneys.

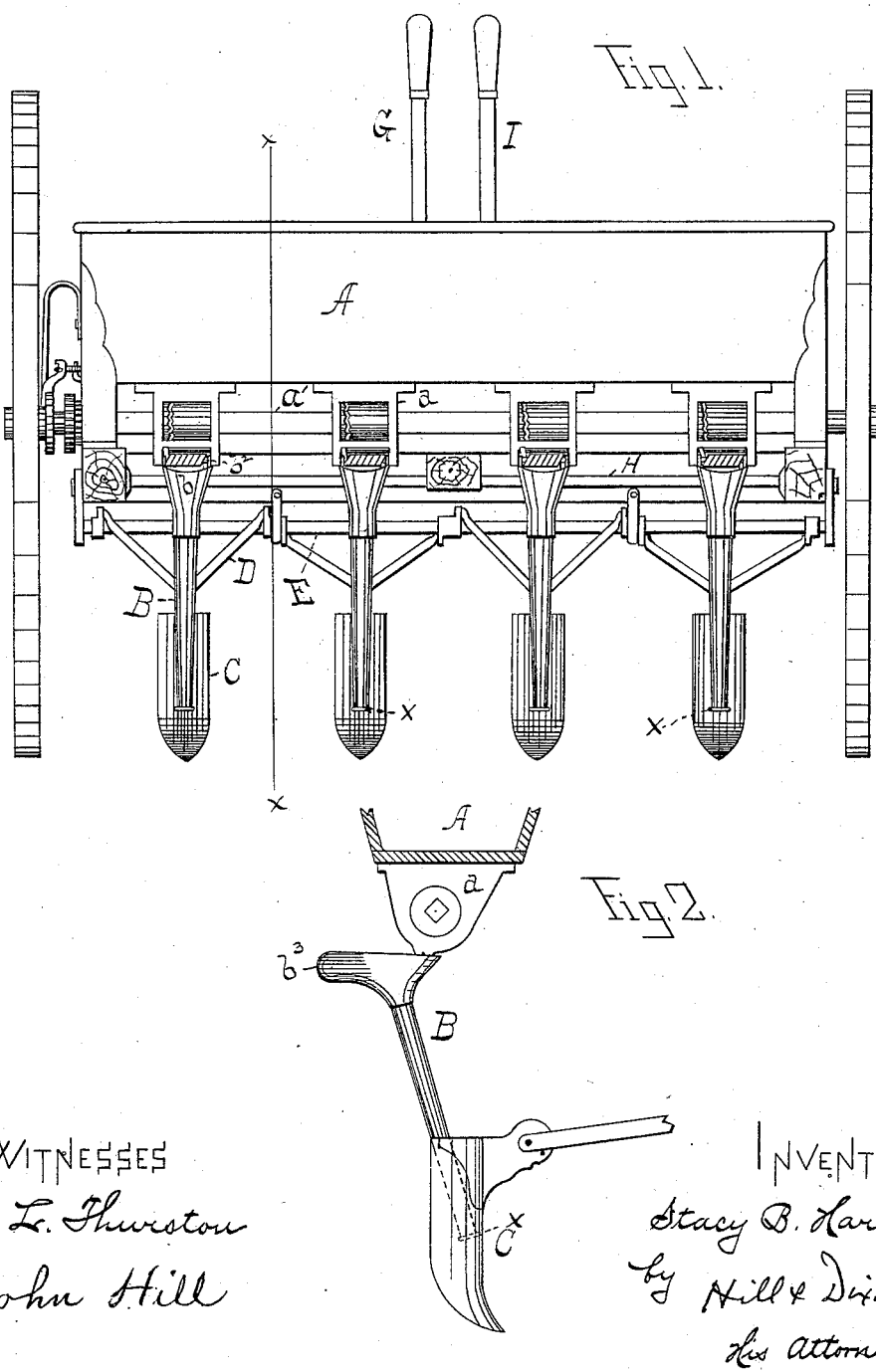

UNITED STATES PATENT OFFICE.

STACY B. HART, OF PEORIA, ILLINOIS.

GRAIN-DRILL.

SPECIFICATION forming part of Letters Patent No. 306,153, dated October 7, 1884.

Application filed October 18, 1883. (No model.)

*To all whom it may concern:*

Be it known that I, STACY B. HART, of the city of Peoria, county of Peoria, and State of Illinois, have invented a new and useful Improvement in Grain-Drills, of which the following is a description, reference being had to the accompanying drawings, in which—

Figure 1 is a rear elevation of a grain-drill containing my improvement. Fig. 2 is a detailed view of a modification of my improved oscillating cup and tube. Fig. 3 is a cross-section taken on the line $x\ x$ in Fig. 1. Fig. 4 is a detailed top view of one of the drag-bars and its connections.

My invention relates to that class of grain-drills in which the seed is conveyed from the hopper to the drill-teeth by conductors pivoted to the hopper so as to be capable of oscillation; and it consists in an improved arrangement of the conductor whereby its lower end is constantly placed under the impulse of a force impelling it forward against the drill-tooth so as to automatically maintain it in contact therewith through its varying positions, all of which will be hereinafter more fully described, and pointed out definitely in the claims.

In the accompanying drawings, A represents the hopper of the drill, provided with the usual series of seed-cups, $a$, within which the feed-wheels mounted on the shaft $a'$ revolve; B, the grain conductors or tubes, and C the hoes or drill-teeth, preferably entirely open at the rear, as shown in Fig. 1. In the class of drills mentioned the conductors which convey the grain to the drill-teeth have usually been constructed of two parts—an upper conducting-spout made of metal, and pivoted to the hopper, and a rubber tube which was attached to the lower end of the spout, and conveyed the grain thence to the drill-tooth. The flexibility of the rubber tube permitted of the adjustment of the hose in a variety of positions, both in straight and zigzag rows, and raised or lowered to the ground. The rubber tubes are, however, expensive, and rapidly deteriorate under exposure, and have to be frequently renewed. To overcome this difficulty a variety of jointed metallic conductors have been tried; but heretofore it has been found impossible to employ in connection with a drill-tooth, adjustable, as described, a single continuous metallic grain-conducting tube, owing to its want of flexibility. I have overcome these difficulties, and by a very simple arrangement.

The grain-conductor B is a metallic tube having its upper end enlarged at $b$ to form an adequate opening for the reception of the grain as it is fed from the hopper, to which the conductor is pivoted, as shown in the drawings. It is necessary that the lower portion of the tube B should be constantly maintained in contact with the drill-tooth C, at least so as to deliver the grain beneath it, when it will be covered by the earth in the forward movement of the drill. In the form of my invention illustrated in the drawings this is accomplished by pivoting the conductor B to the hopper, in connection with a spring, $b^2$, forming what is commonly known as a "spring-hinge," the spring being so adjusted upon the pivot that its tension exerts a constant force upon the conductor B, impelling its lower end forward into contact with the drill-tooth C throughout its varying positions, while at the same time permitting it to move backward and slide over any accidental obstructions encountered. The form of spring employed or its particular location is not essential, as it is obvious that either spiral, flat, or other forms of springs may be employed, and that they may be attached to any convenient portion of the frame-work, so as to exert their tension upon the conductors B with a force tending to press their lower portions in a forward direction, or, as equivalents, instead of springs being used, weights may be employed to exert the requisite pressure.

I have illustrated in the drawings, Fig. 2, a modified and equivalent form of construction in which the conductor B is itself so weighted and pivoted that its lower end is maintained under a constant impulse in a forward direction. In this form of my invention the conductor B is provided with a rearward extension, $b^3$, weighted sufficiently to throw the center of gravity to the rear of the pivot of the conductor, and thus place the body of the conductor under a constant impulse forward against the drill-tooth. In the preferable form of construction its conductor B is provided at or near its lower end with a projecting ferrule, rib, or flange, *x*, (clearly shown in the drawings,) and one advantage secured by this form of construction is that in the sliding movement of the conductor and the drill-tooth upon each other the wear falls wholly upon the ferrule, which protects the body of the conductor from abrasion against the drill-tooth.

I have described the conductor B as pivoted to the hopper A.

In the drawings the connection with the hopper is made through the supplemental feed-cups *a*, Fig. 1, which are rigidly attached to the bottom of the hopper and project downward therefrom.

It is obviously immaterial to the operation of my improvement whether the conductors are pivoted as shown in the drawings, or directly to the hopper itself by straps or lugs depending therefrom; or they may even be pivoted to supplementary spouts interposed between the conductors and the feed-cups *a* without departing from the principle of my invention.

Having thus described my invention, what I claim as new, and desire to secure by Letters Patent, is—

1. In a grain-drill, the combination, with the hopper and the drill-tooth, of an oscillating conductor pivoted to the hopper, and mechanism whereby its lower end is automatically held in contact with the drill-tooth through its varying positions, substantially as and for the purpose set forth.

2. In a grain-drill, the combination, with the hopper and the drill-tooth, of an oscillating conductor pivoted to the hopper, and a spring holding the conductor against the drill-tooth, substantially as and for the purpose set forth.

3. In a grain-drill, the combination, with the hopper and the drill-tooth, of an oscillating conductor attached to the hopper by a spring-hinge, substantially as and for the purpose set forth.

4. In a grain-drill, the combination, with the hopper and an adjustable drill-tooth, of a single metallic conductor-tube pivoted to the hopper, and having the opening at its upper end enlarged to receive the seed, substantially as described.

STACY B. HART.

Witnesses:
EDWIN L. THURSTON,
T. S. E. DIXON.